(12) United States Patent
Goin

(10) Patent No.: US 9,290,233 B2
(45) Date of Patent: Mar. 22, 2016

(54) HUMAN-POWERED DRIVETRAIN

(71) Applicant: William Leland Goin, Austin, TX (US)

(72) Inventor: William Leland Goin, Austin, TX (US)

(*) Notice: Subject to any disclaimer, the term of this patent is extended or adjusted under 35 U.S.C. 154(b) by 0 days.

(21) Appl. No.: 14/205,285

(22) Filed: Mar. 11, 2014

(65) Prior Publication Data

US 2015/0028560 A1    Jan. 29, 2015

Related U.S. Application Data

(60) Provisional application No. 61/753,111, filed on Jan. 16, 2013.

(51) Int. Cl.
| | | |
|---|---|---|
| *B62M 1/32* | (2013.01) | |
| *B62M 11/02* | (2006.01) | |
| *B62M 15/00* | (2006.01) | |
| *B62M 1/28* | (2013.01) | |

(52) U.S. Cl.
CPC .............. *B62M 1/32* (2013.01); *B62M 11/02* (2013.01); *B62M 15/00* (2013.01); *B62M 1/28* (2013.01)

(58) Field of Classification Search
CPC ............ B62M 1/30; B62M 1/24; B62M 1/28; B62M 1/32
See application file for complete search history.

(56) References Cited

U.S. PATENT DOCUMENTS

| | | | |
|---|---|---|---|
| 512,538 A * | 1/1894 | Clark et al. ................ 280/254 |
| 580,512 A * | 4/1897 | Sharpneck ..................... 74/134 |
| 4,639,007 A | 1/1987 | Lawrence |
| 5,330,218 A * | 7/1994 | Escudero .................... 280/245 |
| 5,536,029 A | 7/1996 | Gramckow |
| 5,713,590 A | 2/1998 | Clark |
| 5,915,710 A * | 6/1999 | Miller ......................... 280/252 |
| 6,234,504 B1 | 5/2001 | Taylor |
| 6,482,130 B1 | 11/2002 | Pasero et al. |
| 6,708,997 B2 * | 3/2004 | Chait ........................... 280/245 |
| 6,857,648 B2 * | 2/2005 | Mehmet ....................... 280/217 |
| 7,753,386 B2 | 7/2010 | Drymalski |
| 2004/0204293 A1 | 10/2004 | Andreasen |
| 2009/0283982 A1 | 11/2009 | Thomas |
| 2012/0187649 A1 | 7/2012 | Bayne et al. |

FOREIGN PATENT DOCUMENTS

WO    WO2008039196    4/2008

\* cited by examiner

*Primary Examiner* — Kevin Hurley
(74) *Attorney, Agent, or Firm* — Pierson IP, PLLC

(57) ABSTRACT

Embodiments described herein are configured to receive forces generated by a user moving their appendages, and convert the force into mechanical force and/or energy. More specifically, embodiments may convert axial and/or tangential force into rotational force. The rotational force may be utilized to power devices, drivetrains, vehicles, such as bicycles, tricycles, kayaks, boats, etc.

10 Claims, 10 Drawing Sheets

HUMAN-POWERED DRIVETRAIN

BACKGROUND INFORMATION

1. Field of the Disclosure

Examples of the present disclosure are related to systems and methods for a human-powered drivetrain. Specifically, embodiments are related to human-powered drivetrain that converts force into rotational force.

2. Background

A conventional bicycle is a human-powered, pedal-driven, single-track vehicle. A conventional bicycle has two wheels attached to a frame, where one wheel is positioned behind a second wheel. A conventional bicycle is positioned upright, where a user of the conventional bicycle may apply rotational force to the pedals to move the bicycle. Further, when a pedal of a conventional bicycle is rotated, the second pedal is also automatically rotated. Thus, the pedals are dependent upon each other, therefore the pedals are rotated at the same frequency and amplitude.

Over time, different types of bicycles have been created, such as a rowing bicycle. To use a rowing bicycle a user may use their upper body to pull on a handle. Responsive to the user pulling the handle, the handle may apply force to a gear shaft to move the bicycle. Rowing bicycles only include a single handle that is configured to be pulled by the user's entire upper body.

Accordingly, needs exist for more effective and efficient methods and systems that allow a user to perform independent left and right strokes, while also allowing the user to vary the stroke frequency, displacement and/or amplitude of pedals.

SUMMARY

Human appendages, such as arms and legs, are relatively strong parts of a user's body. The term appendage used herein may refer to a user's legs, arms, or other appendages. A user's legs are typically the strongest appendages and are able to move heavier loads than arms, such as the entire weight of the user's body. Using their legs, the user may be able to walk, run, and lift heavy objects. Utilizing the user's legs, the user may be able to generate force, mechanical power, etc.

Embodiments described herein are configured to receive force generated by a user moving their appendages, and converting the movement into mechanical force and/or energy. More specifically, embodiments may convert axial and/or tangential force into rotational force. The rotational force may be utilized to power devices, drivetrains, vehicles, such as bicycles, tricycles, kayaks, boats, etc. The rotational force may be stored as potential energy, electrical energy, kinetic energy, and used with various devices. Embodiments are configured to receive force generated by a user retracting their appendages by moving their hips back and bending their knees and hips, such that the user's knees are closer to the user's torso and extending their appendages by extending their appendages to be in a linear position.

Embodiments include a human-powered drivetrain coupled to a vehicle that is configured to convert force into rotational force. The human-powered drivetrain may include two independent pedals that are configured to interface with a user's appendages. The independent pedals may be configured to receive force from the user's appendages, wherein the independent pedals may receive force at different frequencies, amplitudes, and/or timing. Therefore, the user may vary the displacement of each pedal via independent strokes, wherein a first appendage may move the vehicle independent to the movement of a second appendage.

In embodiments, a power stroke may refer to the motion of moving a user's appendages in a first direction, and a reset stroke may refer to the motion of moving the user's appendages in a second direction. In embodiments, the first direction may be a motion extending the user's appendages, or the first direction may be a motion retracting the user's appendages. Further, the second direction may be a motion extending the user's appendages, or the second direction may be a motion retracting the user's appendages. Accordingly, the power stroke and reset stroke may refer to the user moving their appendages in opposite directions. In embodiments, a reset stroke and/or a power stroke may be assisted using various mechanical devices, such as hydraulics, springs, etc. For example, upon completing a power stroke, hydraulics and/or springs may apply force in the second direction to assist the user to complete a reset stroke. If only a reset stroke and/or a power stroke is assisted using mechanical devices, then the reset stroke and the power stroke may require different amounts of energy or force.

In embodiments, the user may apply a first power stroke and/or reset stroke to a first pedal, independent to the movement of the second pedal, and vice versa. The user may apply power strokes to both pedals in unison to create more force at a given time, or may apply the power strokes independently to create continuous force. To this end, the movement of the first and second pedals may be independent of each other, and may be made at any desired frequency, amplitude, etc. (e.g. random pedal movements). For example, the first pedal may be at rest while the second pedal performs multiple power strokes.

In embodiments, each pedal may be displaced at varying positions along a drivetrain, wherein each stroke may displace the pedals at various distances. The ability of the pedals to be displaced at various distances may allow users having varied appendage lengths to utilize the human-powered drivetrain without adjustment.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions, or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
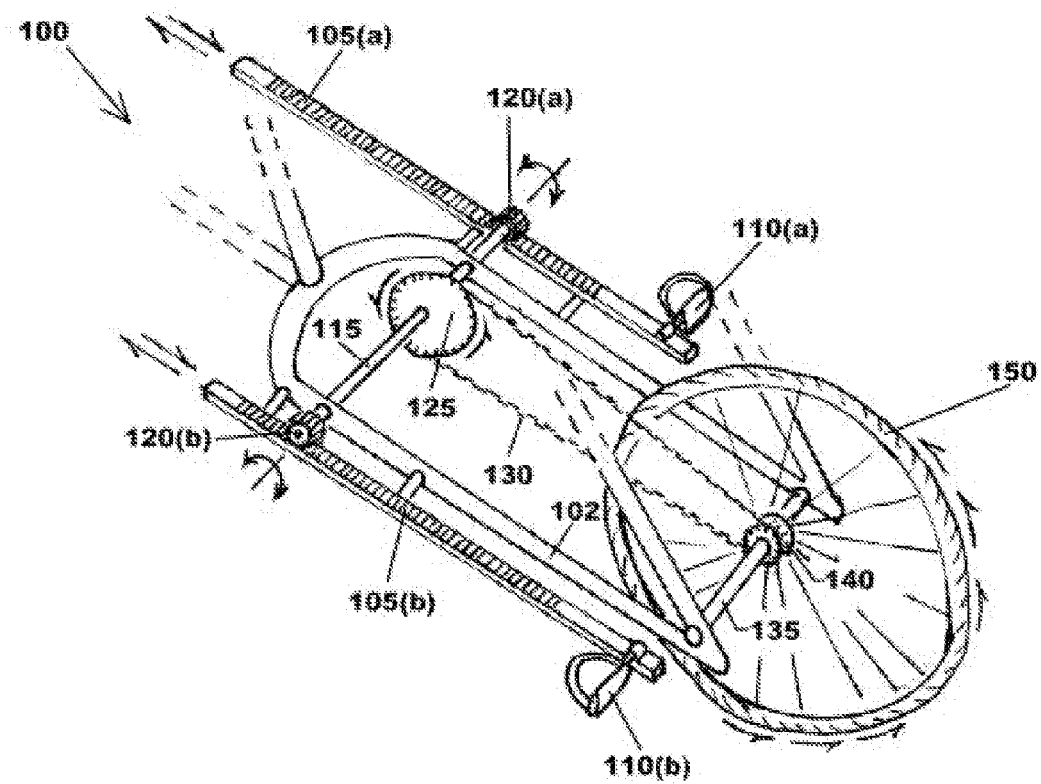
FIG. 1 depicts a human-powered drivetrain, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Embodiments and elements are not necessarily represented to scale in the FIGURES, and are presented as is for simplicity.

DETAILED DESCRIPTION

In the following description, numerous specific details are set forth in order to provide a thorough understanding of the present embodiments. It will be apparent to one having ordinary skill in the art, that the specific detail need not be employed to practice the present embodiments. In other instances, well-known materials or methods have not been described in detail in order to avoid obscuring the present embodiments.

Embodiments described herein disclose a human-powered drivetrain configured to receive forces generated by a user's appendages, and to convert the forces into mechanical rotational force and/or energy.

FIG. 1 depicts a human-powered drivetrain 100, according to an embodiment. Human power drivetrain 100 may include frame 102, first rigid projection 105(a), second rigid projection 105(b), first pedal 110(a), second pedal 110(b), axle 115, first gear 120(a), second gear 120(b), fixed hub 125, chain 130, support axle 135, secondary gear 140, and wheel 150.

Frame 102 may be a frame of human-powered drivetrain 100 onto which other components of human-powered drivetrain 100 may be fitted or coupled, such as rigid projections 105(a) and 105(b), pedals 110(a) and 110(b), axle 115, gears 120(a) and 120(b), fixed hub 125, chain 130, support axle 135, secondary gear 140, and/or wheel 150. Frame 102 may be comprised of various materials, such as metal and/or plastics, and frame 102 may be configured to be made in various shapes and/or sizes. Frame 102 and may be configured to be strong, rigid, and light in weight.

First rigid projection 105(a) and second rigid projection 105(b) may be coupled to frame 102, and be configured to move along a linear axis, wherein the linear axis may be tangential to axle 115 and parallel to chain 130. First rigid projection 105(a) and second rigid projection 105(b) may include a plurality of ridges, projections, teeth, cogs, etc. (referred to hereinafter collectively and individually as projections). The projections disposed on a first surface of first rigid projection 105(a) may be configured to interface with teeth position on first gear 120(a), and projections disposed on a first surface of second rigid projection 105(b) may be configured to interface with teeth positioned on second gear 120(b). In embodiments, first rigid projection 105(a) and second rigid projection 105(b) may have projections positioned on multiple sides of first rigid projection 105(a) and second rigid projection 105(b).

First pedal 110(a) may be a pedal, stirrup, strap, loop, etc. configured to receive a user's first appendage. First pedal 110(a) may be configured to be coupled to first rigid projection 105(a). First pedal 110(a) may be coupled to first rigid projection 105(a) at a position proximate to a first end of first rigid projection 105(a), and may be positioned on a side of first rigid projection 105(a) opposite wheel 150 with respect to frame 102. First pedal 110(a) may be configured to receive force from the user's appendage to move first rigid projection 110(a) in both directions along a linear axis. In embodiments, a reset stroke may be completed by the user moving first pedal 110(a) in a first direction, wherein the first direction may be a movement of first pedal 110(a) from a position proximate to wheel 150 towards the torso of the user. In embodiments, a power stroke may be completed by the user moving first pedal 110(a) in a second direction, wherein the first direction may be a movement of second pedal 110(b) from a position proximate to the user's torso towards wheel 150. Movement of first pedal 110(a) and first rigid projection 105(a) may be made independent of movement of second pedal 110(b) and second rigid projection 105(b).

Second pedal 110(b) may be a pedal, stirrup, strap, loop, etc. configured to receive a user's second appendage. Second pedal 110(b) may be configured to be coupled to second rigid projection 105(b). Second pedal 110(b) may be coupled to second rigid projection 105(b) at a position proximate to a first end of second rigid projection 105(b), and may be positioned on a side of second rigid projection 105(b) opposite wheel 150 with respect to frame 102. Second pedal 110(b) may be configured to receive force from the user's appendage to move second rigid projection 105(b) in both directions along a linear axis. In embodiments, a reset stroke may be completed by the user moving second pedal 110(b) from in a first direction. In embodiments, a power stroke may be completed by the user moving second pedal 110(b) in a second direction. Movement of second pedal 110(b) and second rigid projection 105(b) may be made independent of movement of first pedal 110(a) and first rigid projection 105(a).

Axle 115 may be a central shaft coupled to fixed hub 125, first gear 120(a), second gear 120(b), and chain 130. Axle 115 may be configured to be fixed at a stationary location within frame 102, and axle 115 may rotate responsive to first gear 120(a) or second gear 120(b) being rotated. In embodiments, axle 115 may be coupled to both first gear 120(a) and/or second gear 120(b), such that axle 115 includes a single, central axle that rotates responsive to a power stroke applied to first rigid projection 105(a) or second rigid projection 105(b), wherein axle 115 controls the rotation of wheel 150.

First gear 120(a) may be positioned on a first end of axle 115. First gear 120(a) may have a plurality of mating teeth configured to interface with the projections disposed on first rigid projection 105(a). First gear 120(a) may be a cogwheel that is a rotating machine that interfaces with the projections disposed on first rigid projection in order to generate torque responsive to first rigid projection 105(a) moving along the linear axis. Responsive to first gear 120(a) receiving torque, first gear 120(a) may rotate axle 115 in a first direction. In embodiments, first gear 120(a) may be a freewheeling gear, such that first gear 120(a) may only be rotated in a first direction corresponding to a power stroke, wherein the first direction may be an opposite rotational force to the direction of the power stroke. Therefore, as a user completes a power stroke first gear 120(a) may be rotated in the first direction, and as the user completes a reset stroke first gear 120(a) may not be rotated.

Second gear 120(b) may be positioned on a second end of axle 115. Second gear 120(b) may have a plurality of mating teeth configured to interface with the projections disposed on second rigid projection 105(*b*). Second gear 120(*b*) may be a cogwheel that is a rotating machine that interfaces with the projections disposed on first rigid projection in order to generate torque responsive to second rigid projection 105(*b*) moving along the linear axis. Responsive to second gear 120(*b*) receiving torque, second gear 120(*b*) may rotate axle 115 in the first direction. In embodiments, second gear 120(*b*) may be a freewheeling gear, such that second gear 120(*b*) may only be rotated in the first direction corresponding to a power stroke, wherein the first direction may be an opposite rotational force to the direction of the power stroke. Therefore, as a user completes a power stroke second gear 120(*b*) may be rotated in the first direction, and as the user completes a reset stroke second gear 120(*b*) may not be rotated.

In embodiments, a ratio of the number projections and mating teeth along first rigid projection 105(*a*) and first gear 120(*a*) and second rigid projection 105(*b*) or 120(*b*) may vary to produce different mechanical advantages. The ratio of the number of projections may be configured to be a ratio suitable for a length of an average user's appendages and strength. Furthermore, additional gears and/or drivetrains may be used to increase or decrease the mechanical advantages, such as a multi-speed bicycle.

In embodiments, first rigid projection 105(*a*) or second rigid projection 105(*b*) may be performing a power stroke, reset stroke, or be at rest, while the other projection may be performing a power stroke, reset stroke or be at rest. Furthermore, first rigid projection 105(*a*) or secondary rigid projection 105(*b*) may perform multiple iterations of a power stroke, reset stroke, or be at rest, without moving the other rigid projection. Therefore, human-powered drivetrain 100 allows a user to apply force with both appendages simultaneously, wherein the force generated by each appendage may be added during a power stroke, potentially doubling the force generated by a power stroke. Furthermore, each power stroke or reset stroke may have displaced first rigid projection 105(*a*) or second rigid projection 105(*b*), wherein the displacement of first rigid projection 105(*a*) may be different than the displacement of second rigid projection 105(*b*) and the displacements may vary at different times based on the frequency of strokes, amplitude of strokes, etc.

Fixed hub 125 may be a gear coupled to axle 115 and chain 130. Responsive to axle 115 being rotated, fixed hub 125 may also be rotated. Fixed hub 125 may be configured to be rotated responsive to a user performing a power stroke to move first rigid projection 105(*a*) and/or second rigid projection 105(*b*). Accordingly, two independent rigid projections 105(*a*) and 105(*b*) may be configured to rotate fixed hub 125 at different speeds, frequencies, intervals, and/or amplitudes, wherein fixed hub 125 may be a single central hub, and in other embodiments fixed hub 125 may include multiple hubs.

Chain 150 may be a bicycle chain, such as a roller chain that is configured to transfer power from fixed hub 125 to secondary gear 140. Chain 150 may be comprised of plastic, plain carbon, alloys, metals, or other materials. Chain 150 may include a plurality of orifices configured to receive projections positioned on fixed hub 125 and secondary gear 140. Responsive to fixed hub 125 being rotated, chain 130 may be pulled, and chain 150 may subsequently rotate secondary gear 140.

Secondary axle 135 may be a fixed axle within frame 102 configured to support secondary gear 140 and wheel 150. In embodiments, responsive to secondary gear 140 being moved by chain 130, secondary gear 140 may be rotated about secondary axle 135 and wheel 150 may be rotated.

Figure 2:
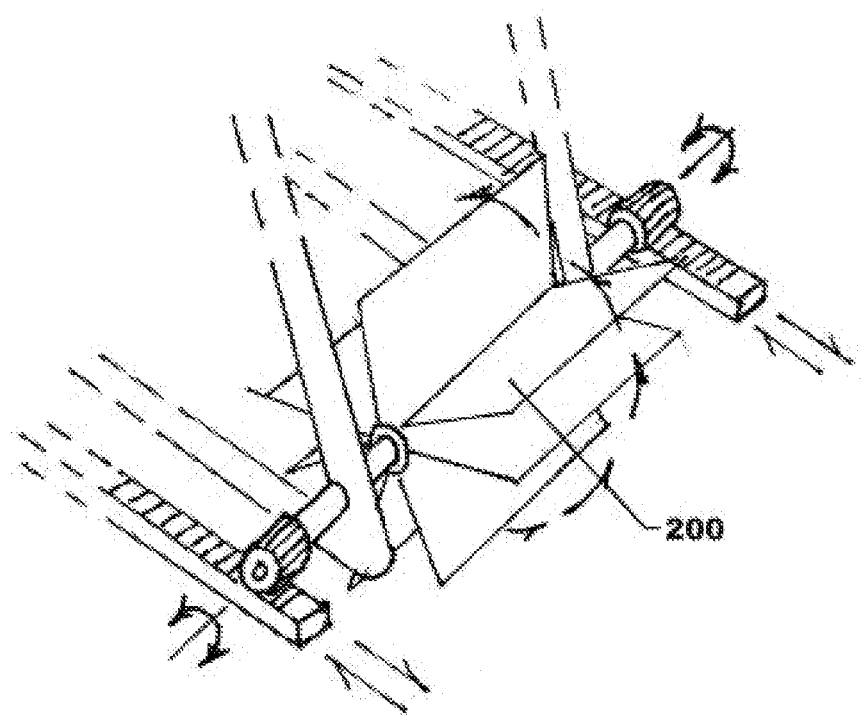
FIG. 2 depicts a human-powered drivetrain, according to an embodiment.

FIG. 2 depicts a human-powered drivetrain 100, according to an embodiment. In the embodiment as depicted in FIG. 2, wheel 150 has been replaced with a boat paddle 200. To this end, human-powered drivetrain 100 may be configured to provide power to move a number of different vehicles, such as bicycles, boats, or any other device where force may move the vehicle.

Figure 3:
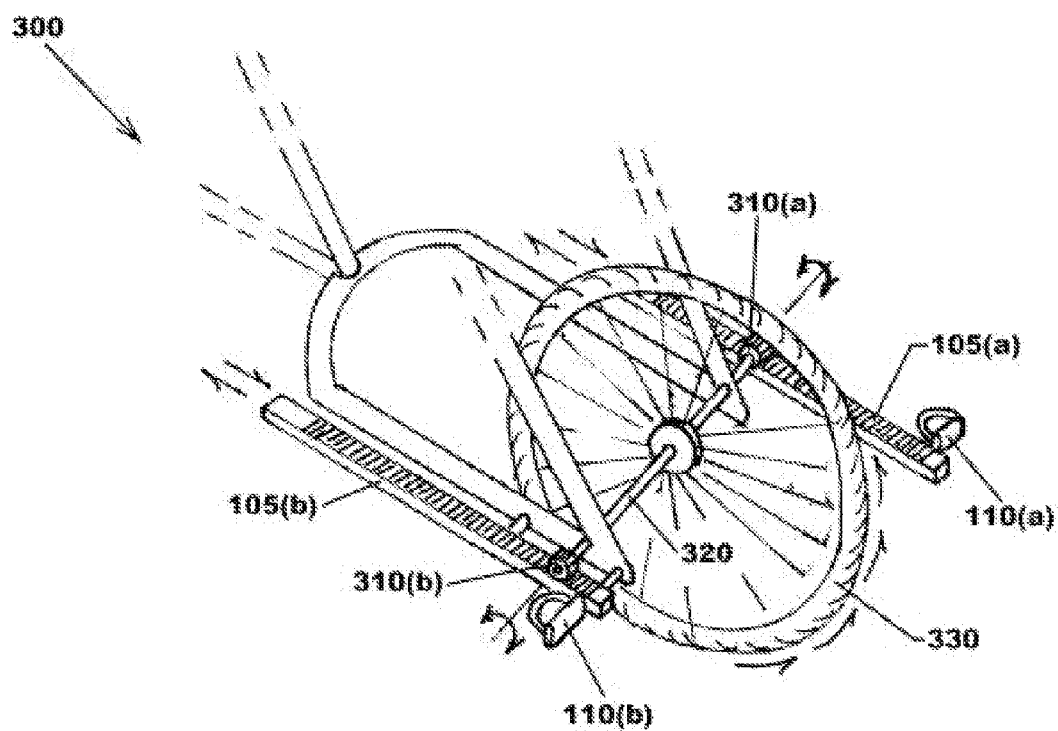
FIG. 3 depicts a human-powered drivetrain, according to an embodiment.

FIG. 3 depicts a human-powered drivetrain 300, according to an embodiment. Human-powered drivetrain 300 may include first rigid projection 105(*a*), second rigid projection 105(*b*), first gear 310(*a*), second gear 310(*b*), axle 320, and wheel 330.

First gear 310(*a*) may be positioned on a first end of axle 320. First gear 310(*a*) may have a plurality of teeth configured to interface with the projections disposed on first rigid projection 105(*a*). Second gear 310(*b*) may be positioned on a second end of axle 320. Second gear 310(*b*) may have a plurality of teeth configured to interface with the projections disposed on second rigid projection 050(*b*).

Axle 320 may be central shaft for coupled to first gear 310(*a*), second gear 310(*b*), frame 102, and wheel 330. Axle 320 may be directly coupled to first gear 310(*a*) and 310(*b*), such that as gears 310(*a*) and 310(*b*) are rotated via rigid projections 105(*a*) and 05*b*), axle 320 may rotate wheel 330.

Figure 4:
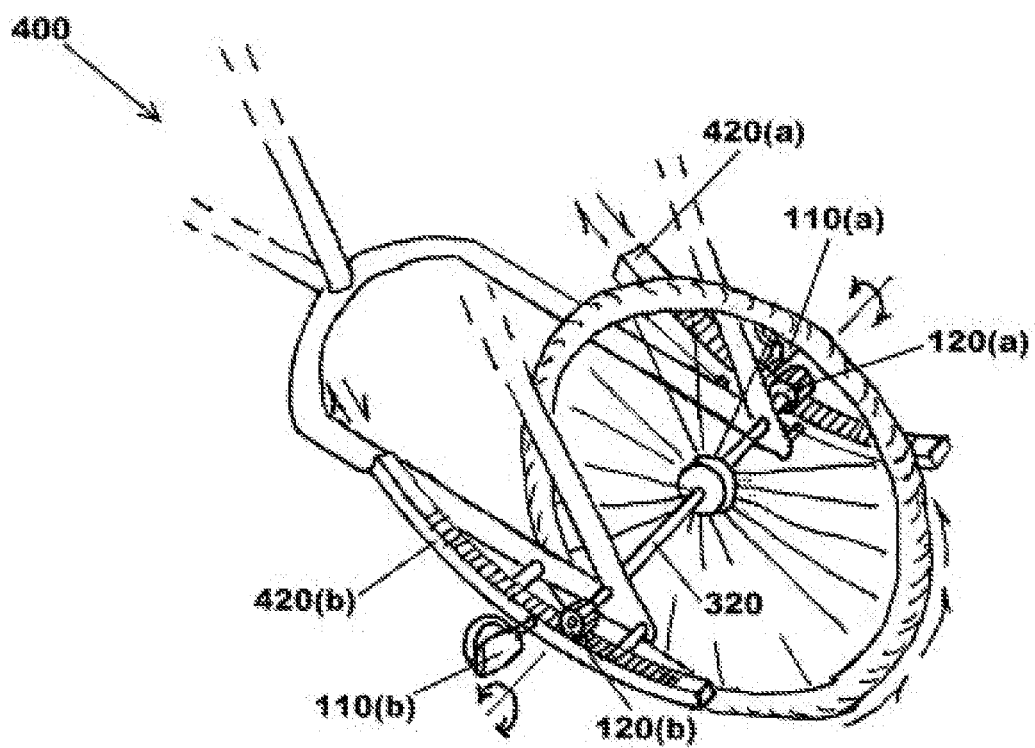
FIG. 4 depicts a human-powered drivetrain, according to an embodiment.

FIG. 4 depicts a human-powered drivetrain 400, according to an embodiment. As depicted in FIG. 4, rigid projections 420(*a*) and 420(*b*) may be curved projections that move along a track. A user may apply force to rigid projections 420(*a*) and 420(*b*) to generate power strokes and reset strokes. Accordingly, rigid projections 420(*a*) and 420(*b*) may be comprised of various shapes and/or sizes, and rigid projections 420(*a*) and 420(*b*) are configured to receive force from a user's appendages to move along tracks, wherein the force applied to one of the rigid projections 420(*a*) and 420(*b*) may independently move human-powered drivetrain 400.

Figure 5:
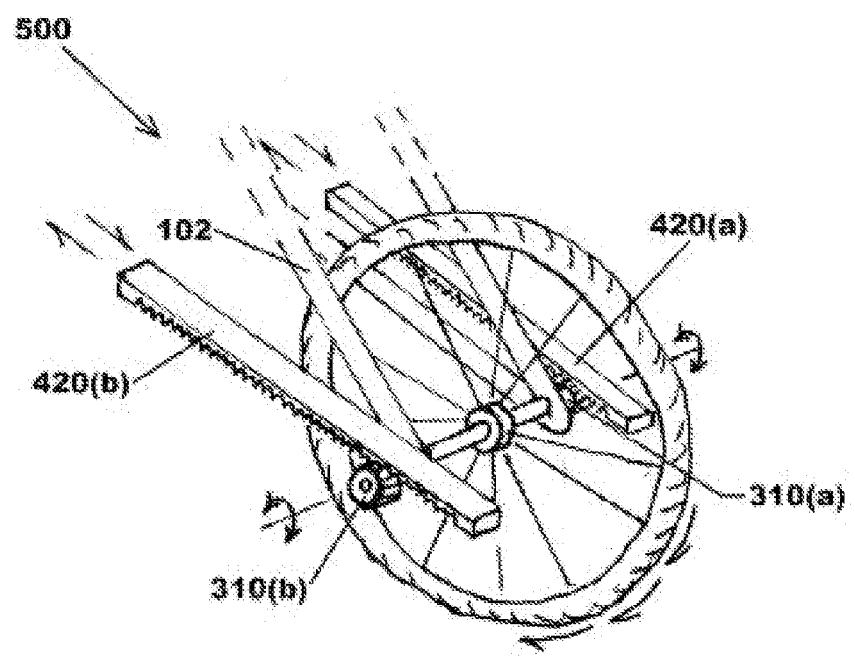
FIG. 5 depicts a human-powered drivetrain, according to an embodiment.

FIG. 5 depicts a human-powered drivetrain 500, according to an embodiment. As depicted in FIG. 5, rigid projections 420(*a*) and 420(*b*) may be positioned on opposite sides of gears 310(*a*) and 310(*b*), respectively. Accordingly, human-powered drivetrain 500 may be configured to move in an opposite direction as human-powered drivetrain 400. To this end, a user may switch the direction of the rotational output by changing the orientation of rigid projections 420(*a*) and 420(*b*) with respect to gears 310(*a*) and 310(*b*). Therefore, human-powered drivetrain 500 may be positioned on a vehicle's front wheel or back wheel at any given point in time.

Figure 6:
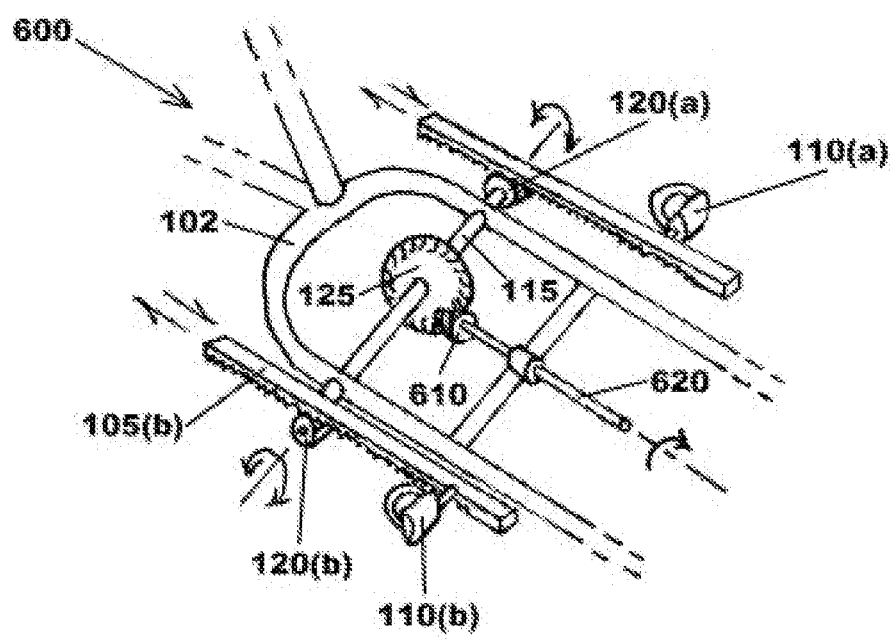
FIG. 6 depicts a human-powered drivetrain, according to an embodiment.

FIG. 6 depicts a human-powered drivetrain 600, according to an embodiment. As depicted in FIG. 6, fixed hub 125 may include a plurality of projections configured to be interfaced with hypoid gear 610. Hypoid gear 610 may be configured to be positioned perpendicular to axle 115, such that as axle 115 is rotated in a first direction, hypoid gear 610 may be rotated in a second direction, wherein the first direction is perpendicular to the second direction. Specifically, hypoid gear 610 may be configured to be offset at a ninety degree angle with respect to fixed hub 125. In embodiments, as fixed hub 125 is rotated, projections positioned on fixed hub 125 may interface with mating teeth faces positioned on hypoid gear 610 to rotate hypoid gear 610.

Drive shaft 620 may be a shaft that is coupled to hypoid gear 610, wherein hypoid gear 610 is coupled to a first end of drive shaft 620. Responsive to hypoid gear 610 being rotated, drive shaft 620 may be rotated in the same direction as hypoid gear 610. Disposed on a second end of drive shaft 620 may be a propeller, fan, etc. The propeller may be configured to interact with another substance such as air or water to move the vehicle coupled to human-powered drivetrain 600.

Figure 7:
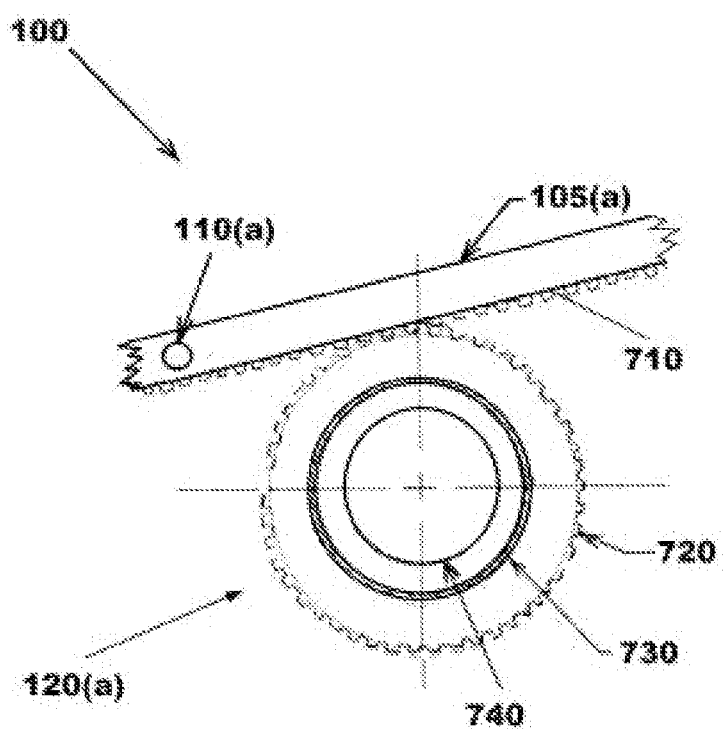
FIG. 7 depicts a side view of a human-powered drivetrain, according to an embodiment.

FIG. 7 depicts a side view of human-powered drivetrain 100, according to an embodiment. FIG. 7 includes embodiments of first rigid projection 105(a), first pedal 110(a), and first gear 120(a). As depicted in FIG. 7, first pedal 110(a) may be coupled at any point along first rigid projection 105(a); however, first pedal 110(a) may be coupled to first rigid projection 105(a) at a location proximate to one end of first rigid projection 105(a).

First rigid projection 105(a) may include projections 710. Projections 710 may be evenly, offset, and/or varied spaced projections, teeth, etc. that are configured to interface with mating teeth 720 positioned on first gear 105(a).

Gear 120(a) may include mating teeth 720, free wheel hub 730, and axle 125. Mating teeth 720 may be shaped, spaced, and/or sized to interface with projections 710, such that as first rigid projection 105(a) moves in a linear direction, mating teeth 720 may rotate gear 120(a) responsive to the force applied by projections 710.

Free wheel hub 730 may be a device configured to allow gear 120(a) to transfer torque to final drive axle 740 in only a single direction. As first rigid projection 105(a) receives force to generate a power stroke, free wheel hub 730 may interface with gear 120(a) to rotate axle 125. However, as first rigid projection 105(a) receives force to generate a reset stroke, free wheel hub 730 may not interface with gear 120(a), and thus axle 125 may not be rotated.

Figure 8:
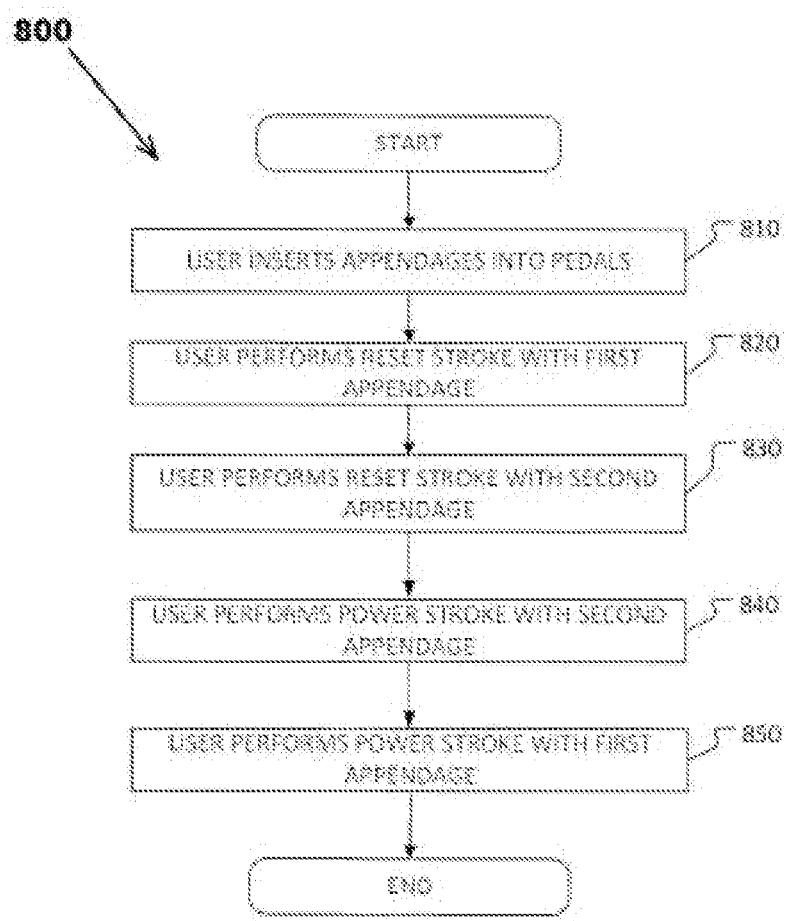
FIG. 8 depicts a method for a human-powered drivetrain.

FIG. 8 depicts a method 800 for a human-powered drivetrain, according to an embodiment. The operations of method 800 presented below are intended to be illustrative. In some embodiments, method 800 may be accomplished with one or more additional operations not described, and/or without one or more of the operations discussed. Additionally, the order in which the operations of method 800 are illustrated in FIG. 8 and described below is not intended to be limiting.

At operation 810, a user may insert a first appendage into a first pedal positioned on a first rigid projection, and the user may insert a second appendage into a second pedal on a second rigid projection. The user may then extend their appendages, such that the pedals are displaced at a position furthest away from the user's torso. Operation 810 may be completed by pedals that are the same as or similar to pedals 110(a) and 110(b), in accordance with one or more implementations.

At operation 820, the user may move their first appendage towards the user's torso. Responsive to the user moving the first appendage towards the user's torso, the first rigid projection may be displaced a first distance, wherein the first distance may be associated with how far the user extends the first appendage. Operation 820 may be completed by a first rigid projection which is the same as or similar to first rigid projection 105(a), in accordance with one or more implementations.

At operation 830, the user may move their second appendage towards the user's torso. Responsive to the user moving the second appendage towards the user's torso, the second rigid projection may be displaced a second distance, wherein the second distance may be associated with how far the user extended the first appendage, and the second distance may be a different distance than the first distance. Operation 830 may be completed by a second rigid projection which is the same as or similar to second rigid projection 105(b), in accordance with one or more implementations.

At operation 840, the user may move their second appendage away from the user's torso to create a power stroke. Responsive to the user extending their second appendage, a second gear may interface with the second rigid projection to move a vehicle. Furthermore, the second appendage may be displaced at a third distance, wherein the third distance may be based on the second distance and how far the user moved their second appendage away from their torso. Operation 840 may be completed by a second rigid projection which is the same as or similar to second rigid projection 105(b), in accordance with one or more implementations.

At operation 850, the user may move their first appendage away from the user's torso to create a power stroke. Responsive to the user extending their first appendage, a first gear may interface with the first rigid projection to move the vehicle. Furthermore, the first appendage may be displaced at a fourth distance, wherein the fourth distance may be based on the first distance and how far the user moved their first appendage away from their torso. Operation 850 may be completed by a first rigid projection which is the same as or similar to first rigid projection 105(a), in accordance with one or more implementations.

One skilled in the art will appreciate that operations 830 and 840 may be made independent to operations 820 and 850, or operations 820 and 830 may be made simultaneously, and operations 840 and 850 may be made simultaneously. As such, the user may chose a desired rate to create reset strokes and/or power strokes for each appendage, wherein the power strokes for the first rigid projection and second rigid projection may be used to rotate the same hub or gear.

FIGS. 9-12 depict embodiments of a user creating power strokes and reset strokes associated with first rigid projection 105(a) and second rigid projection 105(b).

Figure 9:
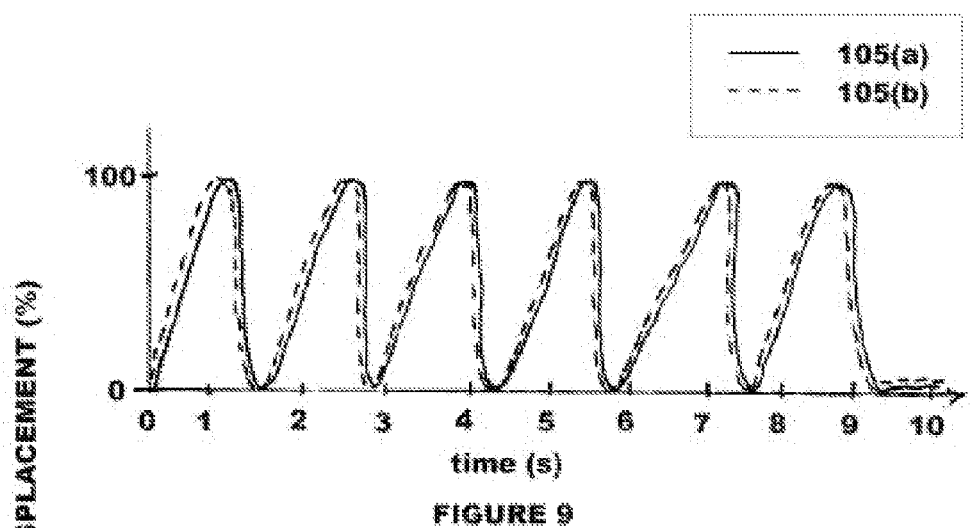
FIGS. 9-12 depict embodiments of a user creating power strokes and reset strokes associated with a first rigid projection and a second rigid projection.

FIG. 9 depicts an embodiment where first rigid projection 105(a) and second rigid projection 105(b) are moved simultaneously, and have the same displacements. Accordingly, when first rigid projection 105(a) is completing a power stroke second rigid projection 105(b) is completing a power stroke, and when first rigid projection 105(a) is completing a reset stroke second rigid projection 105(b) is completing a reset stroke.

Figure 10:
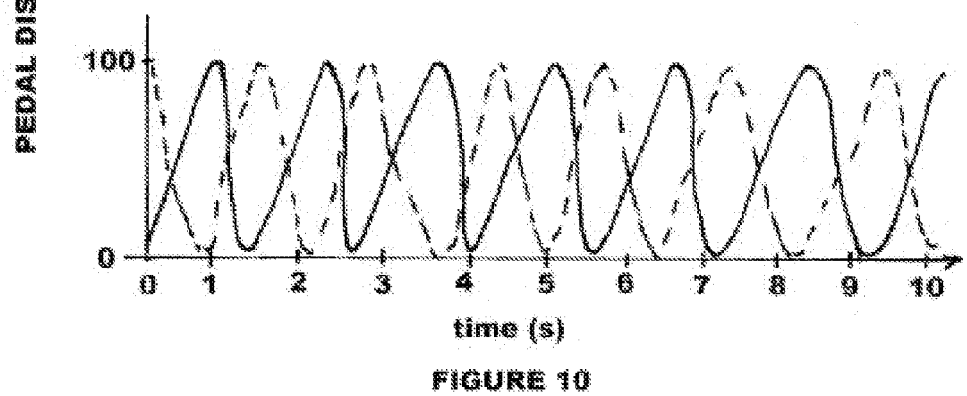

FIG. 10 depicts an embodiment where first rigid projection 105(a) and second rigid projection 105(b) are being moved simultaneously but being phase shifted one hundred eighty degrees. Accordingly, when first rigid projection 105(a) is completing a power stroke second rigid projection 105(b) is completing a reset stroke, and when first rigid projection 105(a) is completing a reset stroke second rigid projection 105(b) is completing a power stroke.

Figure 11:
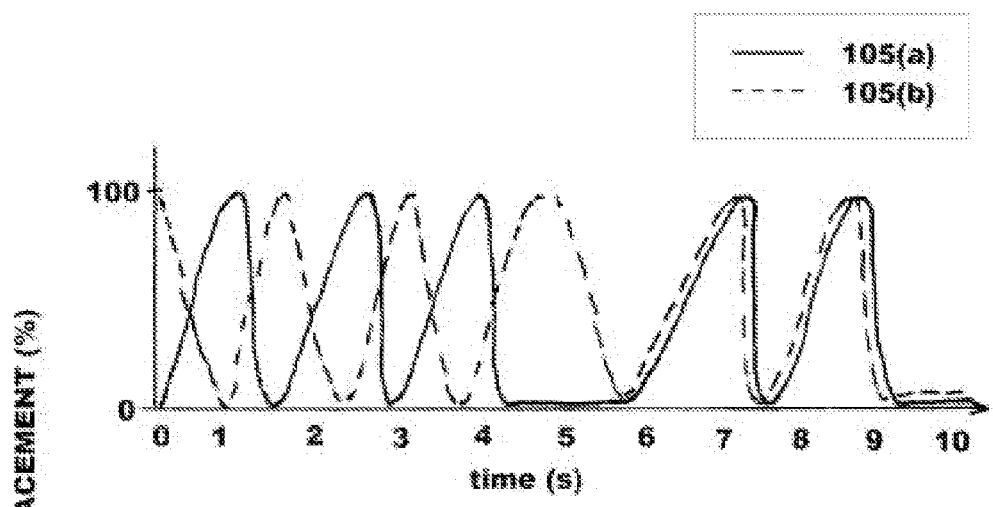

FIG. 11 depicts an embodiment where first rigid projection 105(a) and second rigid projection 105(b) are being moved independently of one another. During a first time period, first rigid projection 105(a) and second rigid projection 105(b) are phase shifted one hundred eighty degrees. During a second time period, second rigid projection 105(b) may complete a power stroke and a reset stroke while first rigid projection 105(a) is at rest. During a third time period, first rigid projection 105(a) and second rigid projection 105(b) may be complete a power stroke and a reset stroke at the same time.

Figure 12:
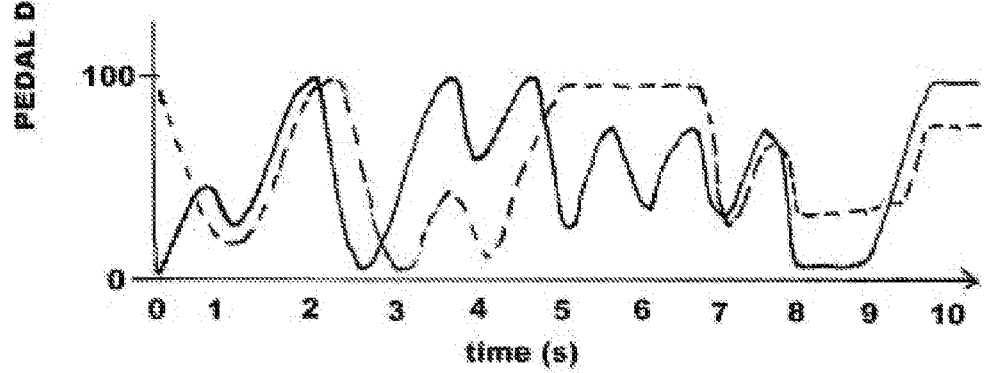

FIG. 12 depicts an embodiment where first rigid projection 105(a) and second rigid projection 105(b) are being moved independent of one another. As depicted in FIG. 12, the movement of first rigid projection 105(a) is not based on the movement of second rigid projection 105(b), and vice versa. Furthermore, the amplitude and/or frequency of power strokes and/or reset strokes may vary.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, and methods.

What is claimed is:

1. A human-powered drivetrain comprising:
a first rigid projection configured to move, the first rigid projection including a first pedal, the first rigid projection including a first plurality of projections positioned on a first surface of the first rigid projection, wherein the first rigid projection is configured to complete a first reset stroke responsive to receiving force from a first appendage in a first direction, wherein the first rigid projection is a linear projection and the first pedal is positioned on a distal end of the first rigid projection;
a second rigid projection configured to move, the second rigid projection including a second pedal, the second rigid projection including a second plurality of projections positioned on a first surface of the second rigid projection, wherein the second rigid projection is configured to complete a second reset stroke responsive to receiving force from a second appendage in the first direction, wherein the second rigid projection is a linear projection and the second pedal is positioned on a distal end of the second rigid projection;
a first gear including a first plurality of mating teeth, the mating teeth being configured to interface with the first plurality of projections position on the first surface of the first rigid projection, wherein the first gear is configured to rotate;
a second gear including a second plurality of mating teeth, the second mating teeth being configured to interface with the second plurality of projections position on the second surface of the second rigid projection, wherein the second gear is configured to rotate; and
an axle including the first gear positioned on a first end of the axle and the second gear positioned on the first end of the axle, wherein the axle is configured to rotate in a first direction responsive to the first gear or the second gear being rotated, wherein the first rigid projection and the second rigid projection are configured to be moved independently of one another.

2. The human-powered drivetrain of claim 1, wherein the first reset stroke displaces the first rigid projection a first distance, and the second reset stroke displaces the first rigid projection a second distance, wherein the first distance and second distance are different distances.

3. The human-powered drivetrain of claim 2, wherein the first rigid projection is configured to complete a first power stroke responsive to receiving force from the first appendage in a second direction, and the second rigid projection is configured to complete a second power stroke responsive to receiving force from the second appendage in the second direction.

4. The human-powered drivetrain of claim 3, wherein the first power stroke displaces the first rigid projection a third distance, and the second power stroke displaces second rigid projection a fourth distance, wherein the third and fourth distances are different distances.

5. The human-powered drivetrain of claim 4, wherein the third distance is based on the first, and the fourth distance is based on the second distance.

6. The human-powered drivetrain of claim 3, wherein the first gear and the second gear are freewheeling gears configured to rotate the axle during the first power stroke and the second power stroke but not during the first reset stroke or the second reset stroke.

7. The human-powered drive-train of claim 3, wherein the axle is configured to rotate responsive to the first power stroke and the second power stroke.

8. The human-powered drivetrain of claim 1, wherein the first rigid projection and the second rigid projection are configured to move at independent frequencies.

9. The human-powered drivetrain of claim 1, wherein the first rigid projection and the second rigid projection are configured to move at independent amplitudes.

10. A human-powered drivetrain comprising:
a first rigid projection configured to move, the first rigid projection including a first pedal, the first rigid projection including a first plurality of projections positioned on a first surface of the first rigid projection, wherein the first rigid projection is configured to complete a first reset stroke responsive to receiving force from a first appendage in a first direction, and the first surface is a planar surface;
a second rigid projection configured to move, the second rigid projection including a second pedal, the second rigid projection including a second plurality of projections positioned on a first surface of the second rigid projection, wherein the second rigid projection is configured to complete a second reset stroke responsive to receiving force from a second appendage in the first direction, and the second surface is a planar surface;
a first gear including a first plurality of mating teeth, the mating teeth being configured to interface with the first plurality of projections position on the first surface of the first rigid projection, wherein the first gear is configured to rotate;
a second gear including a second plurality of mating teeth, the second mating teeth being configured to interface with the second plurality of projections position on the second surface of the second rigid projection, wherein the second gear is configured to rotate; and
an axle including the first gear positioned on a first end of the axle and the second gear positioned on the first end of the axle, wherein the axle is configured to rotate in a first direction responsive to the first gear or the second gear being rotated, wherein the first rigid projection and the second rigid projection are configured to be moved independently of one another.

* * * * *